United States Patent
Mizoguchi

(10) Patent No.: US 8,606,179 B2
(45) Date of Patent: *Dec. 10, 2013

(54) CELL PHONE TERMINAL, METHOD FOR STARTING DATA PROCESSING, METHOD FOR TRANSFERRING DATA

(75) Inventor: Tamiyuki Mizoguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,879

(22) Filed: Mar. 29, 2012

(65) Prior Publication Data

US 2012/0184214 A1 Jul. 19, 2012

Related U.S. Application Data

(63) Continuation of application No. 12/067,206, filed on Mar. 18, 2008, now Pat. No. 8,170,478.

(30) Foreign Application Priority Data

Sep. 26, 2005 (JP) ................................ 2005-278637

(51) Int. Cl.
*H04B 5/00* (2006.01)
(52) U.S. Cl.
USPC ...................... 455/41.1; 455/41.2; 455/556.1
(58) Field of Classification Search
USPC ..................................... 455/41.1, 41.2, 556.1
See application file for complete search history.

(56) References Cited

U.S. PATENT DOCUMENTS

| | | | |
|---|---|---|---|
| 6,347,290 B1 | 2/2002 | Bartlett | |
| 7,135,637 B2 * | 11/2006 | Nishitani et al. | 84/723 |
| 7,929,710 B2 * | 4/2011 | Iriyama | 381/58 |
| 2002/0020743 A1 * | 2/2002 | Sugukawa et al. | 235/435 |
| 2003/0045274 A1 * | 3/2003 | Nishitani | 455/414 |

FOREIGN PATENT DOCUMENTS

| | | | |
|---|---|---|---|
| JP | 2002-279536 | * | 9/2002 |
| JP | 2005-260996 | * | 9/2005 |
| WO | 2005/071636 A1 | | 8/2005 |

OTHER PUBLICATIONS

Colin Swindells et al., "That one there! Pointing to establish device identity", In Symposium on User Interface Software and Technology (UIST'02), 2002, pp. 151-160.
The Extended European Search Report for EP 06810266.4 dated on Mar. 21, 2013.

* cited by examiner

*Primary Examiner* — Tuan H Nguyen

(57) ABSTRACT

The present invention provides a portable terminal which can easily start processing for data selected to be processed, a method for starting data processing, and a method for transferring data. A cell phone terminal 11 includes a sensor 22 detecting change in posture or physical movement of the present terminal. The cell phone terminal 11 includes an interface for selecting, by a user, arbitrary data from data stored beforehand in a memory 15. When the sensor 22 detects the change in posture or physical movement of the present terminal in a state that any data are selected by an interface, a predetermined operation is performed on the selected data as a target to be processed.

8 Claims, 7 Drawing Sheets

FIG. 2
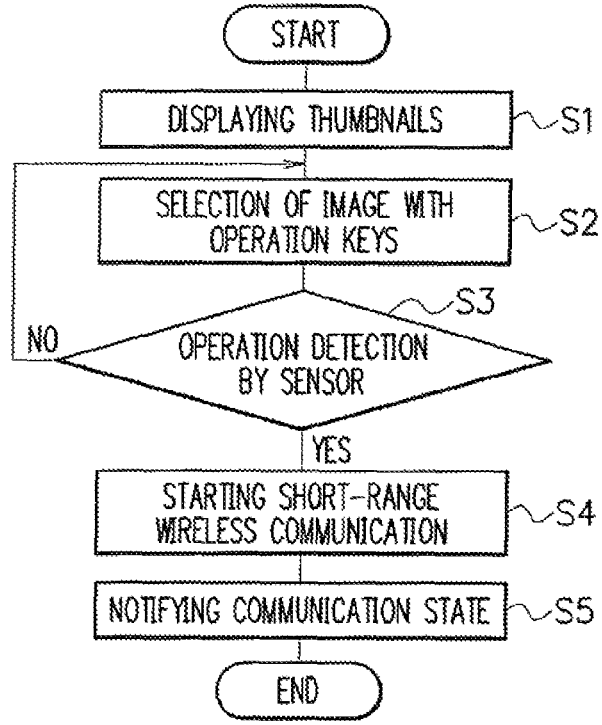
FIG. 3
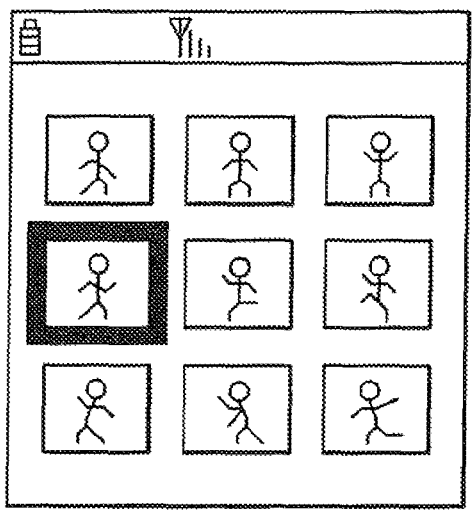
(a)
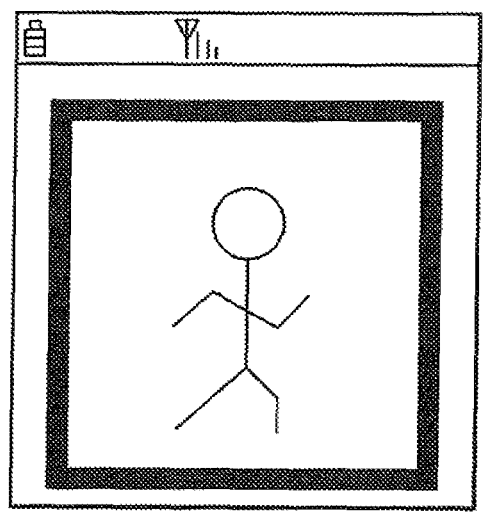
(b)

FIG. 10
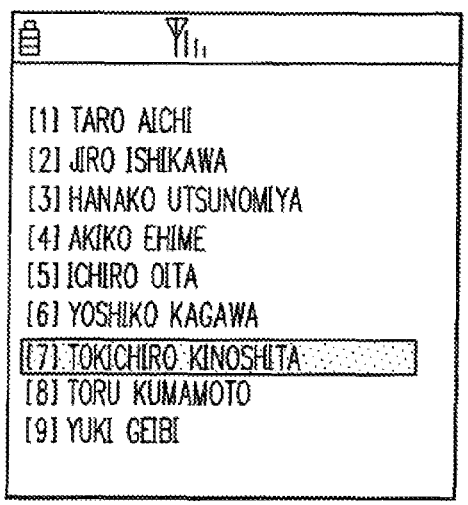
(a)  (b)

CELL PHONE TERMINAL, METHOD FOR STARTING DATA PROCESSING, METHOD FOR TRANSFERRING DATA

REFERENCE TO RELATED APPLICATION

This is a continuation application of U.S. patent application Ser. No. 12/067,206 filed Mar. 18, 2008 now U.S. Pat. No. 8,170,478 and claims the benefit of its priority.

TECHNICAL FIELD

The present invention relates to a portable terminal having a function for data transfer between terminals. More particularly, the present invention relates, to a portable terminal which can easily realize data transfer between terminals.

BACKGROUND ART

The recent portable terminal has many functions. A number of portable terminals which require complicated operations in order to use the functions provided therein is increasing.

For example, there is a portable terminal including a function for sending/receiving data between terminals by using short-range wireless communication. For using this function, a user should perform a predetermined operation. However, in many cases, this predetermined operation includes many operations such as button operations or should perform complicated operations; therefore, a user who is not used to operating the portable terminal may be unable to complete the operations, or the user may wrongly operate the portable terminal.

Accordingly, it is necessary to simplify the operation for using the function provided in the portable terminal.

There is a "mobile detection device" disclosed in a patent document 1 as the conventional art related to a device, which starts communication without particular operations. In the patent document 1, when a vibration is detected within a predetermined time after a change in a light-receiving amount of infrared rays is detected (or in the reverse case), the mobile detection device determines that an object to be detected is moved and outputs an abnormal signal.

Patent Document 1: Japanese Patent Application Laid-Open No. 2002-279536

DISCLOSURE OF THE INVENTION

Problems to be Resolved by the Invention

However, the invention disclosed in the patent document 1 is applied to detect that the object (e.g., picture) to be detected placed at a predetermined position is moved from the position. That is, the objects which may be moved are not originally assumed as the object to be detected. The change in the light-receiving amount and the transmission of the external vibration always occur in a portable terminal having portability.

Moreover, in the case of the short-range wireless communication in the portable terminal, if the short-range wireless communication between the terminals is started only under a condition of the detection of the change in the light-receiving amount and the vibration as requirements, the operation for starting the short-range wireless communication is frequently performed at an unnecessary timing.

Accordingly, the invention disclosed in the patent document 1 cannot be applied to start the short-range wireless communication between the portable terminals.

The invention disclosed in the patent document 1 is also not applied to processing other than data transfer using the short-range wireless communication. If the operation for starting such a processing is complicated, a user who is not used to operating the portable terminal may be unable to complete the operation, or a user may wrongly operate the portable terminal.

The present invention has been achieved in view of such problems, an exemplary object of the present invention is to provide a portable terminal which can easily start processing for data selected to be processed, a method for starting data processing and a method for transferring data.

Means for Solving the Problems

In order to achieve the above exemplary object, as a first exemplary aspect, the present invention provides a portable terminal including an interface for selecting, by a user, arbitrary data from data stored beforehand. This portable terminal includes a sensor which detects change in posture or physical movement of the present terminal and is characterized in that when the sensor detects the change in posture or physical movement of the present terminal in a state that any data are selected by the interface, a predetermined operation is performed on the selected data as a target to be processed.

In the first exemplary aspect of the present invention, the portable terminal includes an external communication unit which performs short-range wireless communication with another terminal. Preferably, when the sensor detects the change in posture or physical movement of the present terminal in a state that the data to be transferred are selected by the interface, the short-range wireless communication is performed to send the selected data to be transferred to another terminal. In addition, more preferably, when the sensor detects that the present terminal is tilted at an angle more than a predetermined angle in a state that the data to be transferred are selected, the data to be transferred are sent to another terminal. Further, more preferably, when the sensor detects acceleration larger than a predetermined value in a state that the data to be transferred are selected, the data to be transferred are sent to another terminal.

In these constitutions, the portable terminal preferably includes a unit which generates an alarm sound while the data to be transferred are sent to another terminal. In addition, the portable terminal preferably includes a unit which generates vibration while the data to be transferred are sent to another terminal. Further, the external communication unit preferably performs infrared communication with another terminal by using an infrared signal.

In any constitutions of the first exemplary aspect of the present invention, it is preferable that the portable terminal is a mobile communication terminal performing communication through a mobile communication network.

In order to achieve the above exemplary object, as a second exemplary aspect, the present invention provides a method for starting data processing using a portable terminal including an interface for selecting, by a user, arbitrary data from data stored beforehand. The method for starting data processing is characterized in that when a sensor which detects change in posture or physical movement of the portable terminal detects the change in posture or physical movement of the portable terminal in a state that arbitrary data are selected from data stored in the portable terminal, a predetermined processing performed on the selected data as a target to be processed is started by the portable terminal.

In addition, in order to achieve the above exemplary object, as a third exemplary aspect, the present invention provides a method for transferring data using a portable terminal including an interface for selecting data to be transferred from data stored beforehand and including an external communication unit which performs short-range wireless communication with another terminal. The method for transferring data is characterized in that when a sensor which detects change in posture or physical movement of the portable terminal detects the change in posture or physical movement of the portable terminal in a state that arbitrary data as the data to be transferred are selected by the interface from among the data stored beforehand in the portable terminal, the data to be transferred are sent from the portable terminal to another terminal by the external communication unit.

In the third exemplary aspect of the present invention, preferably, when the sensor detects that the present terminal is tilted at an angle more than a predetermined angle in a state that the data to be transferred is selected, the data to be transferred are sent from the portable terminal to another terminal. In addition, preferably, when the sensor detects acceleration larger than a predetermined value in a state that the data to be transferred are selected, the data to be transferred are sent from the portable terminal to another terminal. Moreover, it is preferable that an alarm sound is generated from the portable terminal while the data to be transferred is sent from the portable terminal to another terminal. Furthermore, the portable terminal is preferably vibrated while the data to be transferred are sent from the portable terminal to another terminal.

Effect of the Invention

The present invention can provide a portable terminal which can easily start processing for data selected to be processed, a method for starting data processing, and a method for transferring data.

BRIEF DESCRIPTION OF THE DRAWINGS

FIG. 2 is a view showing an operation flow of a cell phone terminal according to an exemplary embodiment of the present invention;

FIG. 3 is a view showing an example of an interface for selecting image data to be transferred;

FIG. 10 is a view showing an example of an interface for selecting telephone book data to be transferred.

Figure 1:
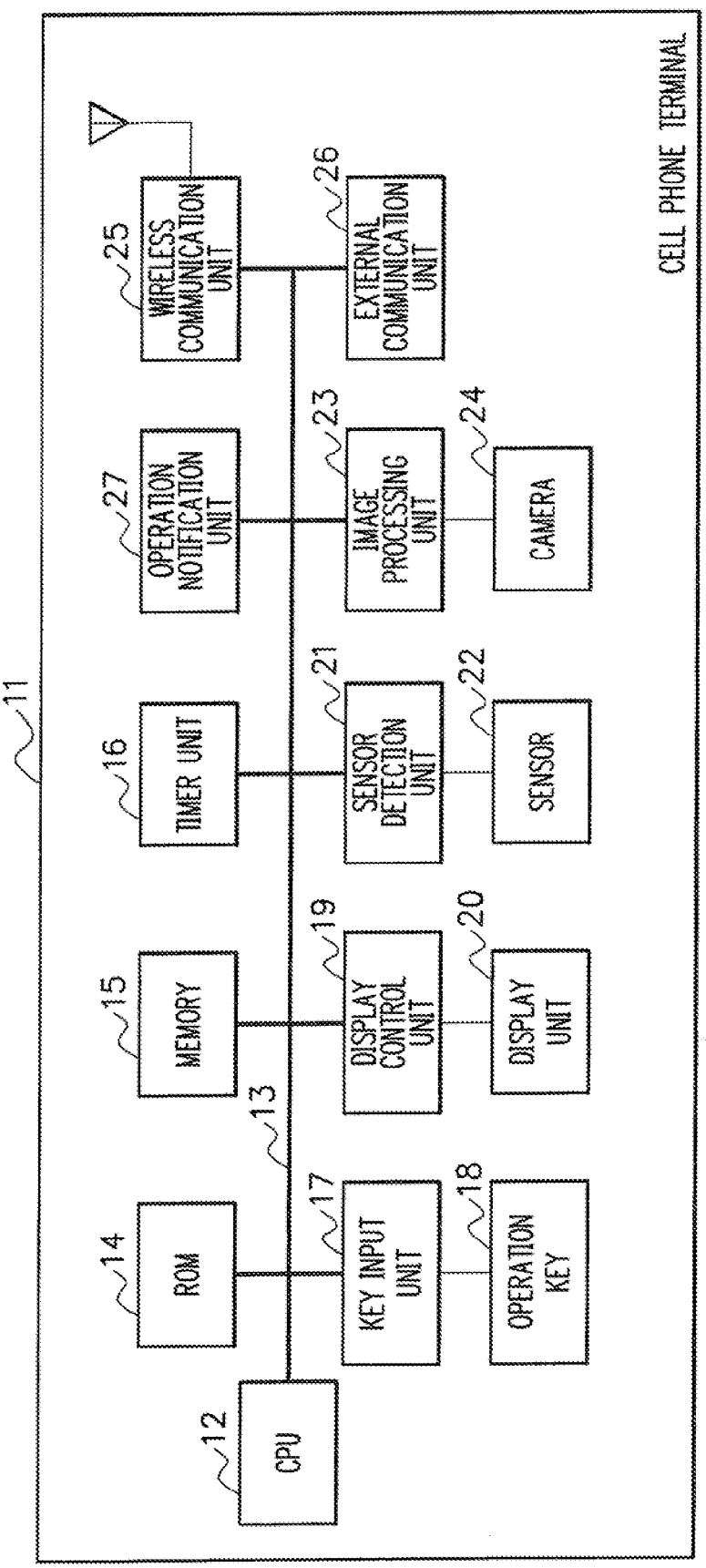
FIG. 1 is a view showing a constitution of a cell phone terminal according to an exemplary embodiment of the present invention.

DESCRIPTION OF THE REFERENCE NUMERALS 11 cell phone terminal
12 CPU
13 BUS
14 ROM
15 memory
16 timer unit
17 key input unit
18 operation key
19 display control unit
20 display unit
21 sensor detection unit
22 sensor
23 image processing unit
24 camera
25 wireless communication unit
26 external communication unit

BEST MODE FOR CARRYING OUT THE INVENTION

Hereinafter, exemplary embodiments of the present invention are described.

A constitution of a cell phone terminal according to the exemplary embodiment is shown in FIG. 1. A cell phone terminal 11 includes a CPU 12, a bus 13, a ROM 14, a memory 15, a timer unit 16, a key input unit 17, an operation keys 18, a display control unit 19, a display unit 20, a sensor detection unit 21, a sensor 22, an image processing unit 23, a camera 24, a wireless communication unit 25, and an external communication unit 26.

The CPU 12 controls an operation of the cell phone terminal 11. The bus 13 connects each function part of the cell phone terminal 11 to transfer a signal. The ROM 14 is a read-only memory storing each kind of control program to be performed by the CPU 12. The memory 15 is a storage area in which user data such as a telephone book, electronic mails, and images taken by a camera are stored, and comprised of a nonvolatile memory. The timer unit 16 counts the time to search an external apparatus as a communication counterpart in communication with the external apparatus such as another cell phone. The key input unit 17 is a circuit for receiving key input from each kind of the operation keys 18 such as a four-way key and digit keys. The display control unit 19 is a control circuit for controlling the display in the display unit 20. The display unit 20 is a display device such as a color liquid crystal panel disposed in a front surface of the apparatus body of the cell phone terminal 11. The sensor detection unit 21 is a circuit for processing information of the sensor 22, which detects the movement of the cell phone terminal 11 such as tilting or swinging in a lateral or longitudinal direction and converts the movement into an electric signal, to send the information to the CPU 12. The image processing unit 23 is a circuit for processing for such as converting an image taken by the camera 24 into the image data which can be stored in the memory 15. The wireless communication unit 25 is a circuit for wirelessly sending/receiving data. The external communication unit 26 is a circuit for communicating with an external apparatus such as another cell phone terminal by the wireless communication such as infrared rays or radio transmission. An operation notification unit 27 includes a sound source circuit and a vibration apparatus and generates predetermined melody sound and vibration when a telephone call or mail arrives, in taking an image with a camera, or in the communication using the external communication unit 26, and thus to notify an operation of the present terminal to a user.

The cell phone terminal 11 is provided with an infrared port for generating an infrared signal for the purpose of data communication with another cell phone terminal and a wireless communication circuit as the external communication unit 26 used for the short-range wireless communication. Therefore, user data such as photographing image data, telephone book data, and electronic mail data can be directly transferred between terminals.

Hereinafter, an operation for sending photographing image data stored in the memory 15 to another terminal is described.

The operation flow is shown in FIG. 2.

The CPU 11 displays the photographing image data stored in the memory 15 as thumbnails in the display unit 20, as shown in FIG. 3(*a*), to prompt a user to select the image data (step S1). The display control unit 19 changes or heightens a display color around the selected image in accordance with a user's operation using the operation keys 18 so that the user can recognize that cursor is matched (selected) to the selected image (step S2). As shown in FIG. 3(*b*), the image data to be selected may not be displayed as thumbnails, but be displayed so as to fill the entire display screen.

Figure 4:
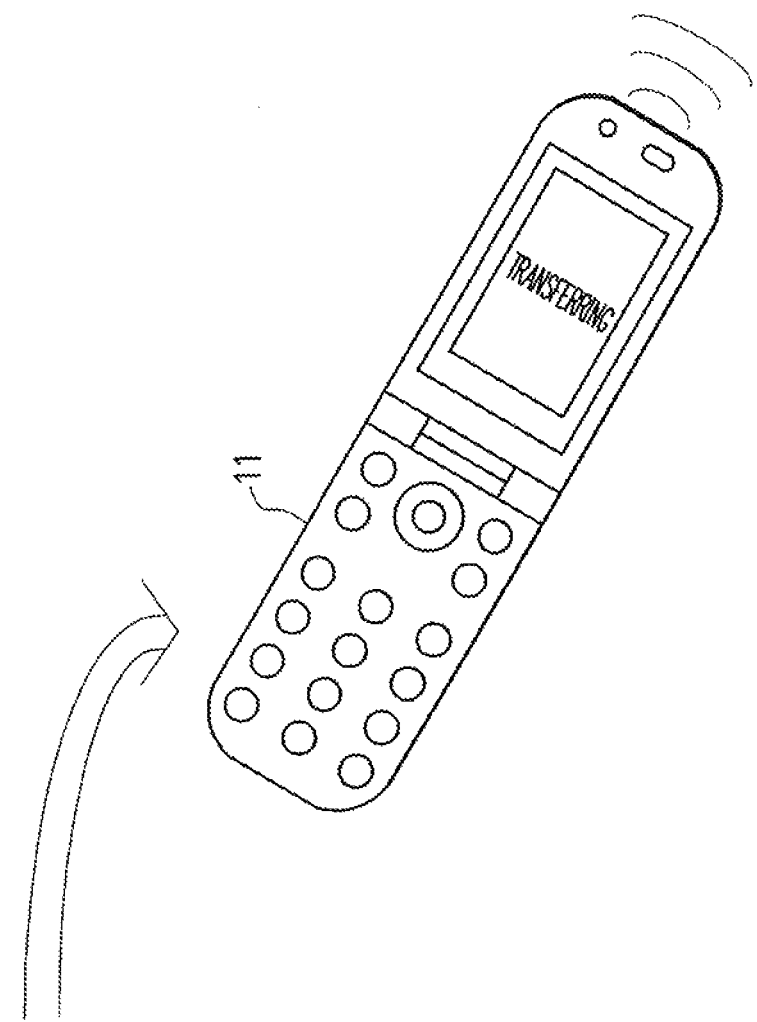
FIG. 4 is a view showing that data communication is started by tilting a cell phone terminal during selection of data to be transferred.

As shown in FIG. 4, when the terminal is tilted in a state that the photographing image data is selected, the sensor detection unit 21 processes a signal output from the sensor 22 to notify the CPU 12 that the cell phone terminal 11 is tilted (step S3/Yes).

Figure 5:
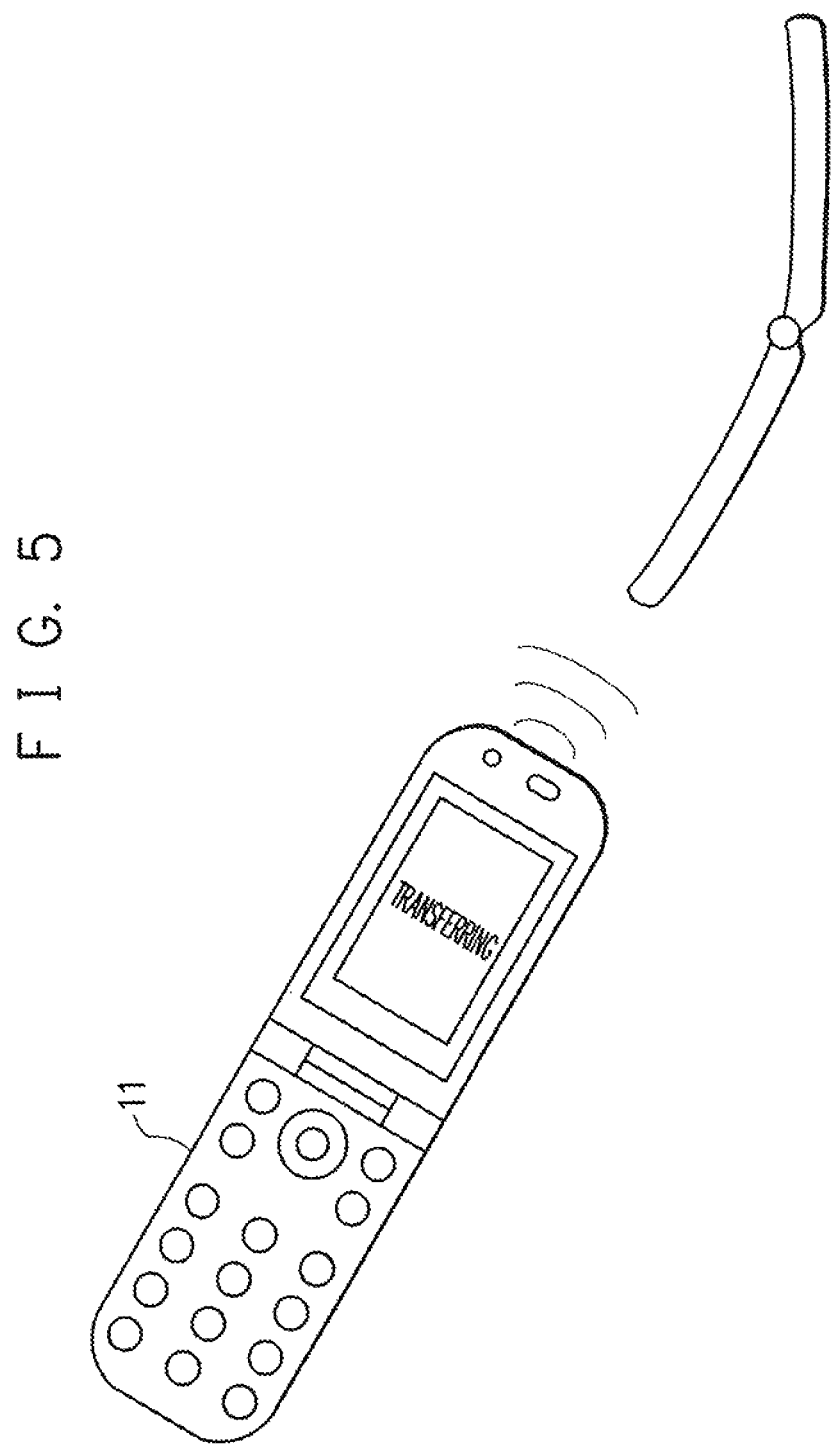
FIG. 5 is a view showing a state that a communication port of a cell phone terminal of a sending side and a communication port of a cell phone terminal of a receiving side are faced to each other.

The CPU 12 which has been notified that the cell phone terminal 11 is tilted searches a terminal as a communication counterpart. The external communication unit 26 performs directional wireless communication (e.g., infrared communication, laser communication, and visible light communication), while the CPU 12 displays a message, which requires a communication port to direct toward the communication counterpart (a state shown in FIG. 5), in the display unit 20.

When the communication counterpart can be recognized before the timer unit 16 is timed up, the CPU 12 drives the external communication unit 26 to start sending of the selected data (step S4).

The CPU 12 displays a message in the display unit 20 during the data sending to notify a start of the data transfer to the user (step S5).

When the data sending is completed, the CPU 12 sends an instruction to the display control unit 19 to display the message for notifying completion of the data sending in the display unit 20.

The CPU 12 preferably makes the operation notification unit 27 generate an alarm sound and vibration during the communication using the external communication unit 26. For instance, a shower sound and vibration are generated during the communication using the external communication unit 26, and then when the data sending is finished, the melody sound and vibration are stopped, whereby the user can recognize the completion of the communication without confirming the message displayed in the display unit 20.

Figure 6:
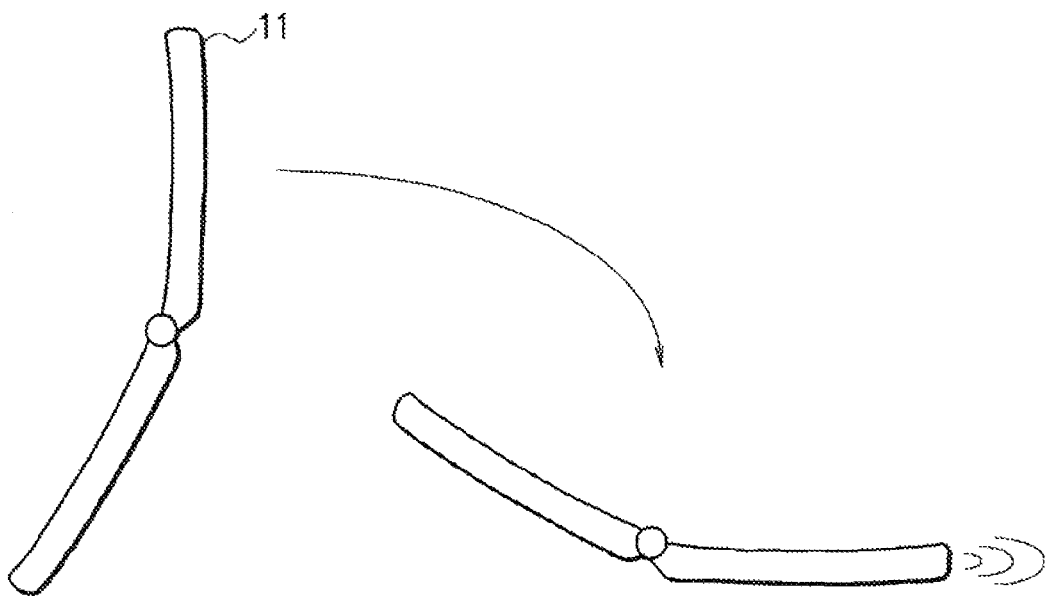
FIG. 6 is a view showing that data communication is started by shaking a cell phone terminal.

In the above example, the data sending is started by tilting the cell phone terminal 11 in a state that the photographing image data is selected however, as shown in FIG. 6, the data sending may be started by detecting that the cell phone terminal 11 was rapidly swung down or shaken laterally.

Figure 7:
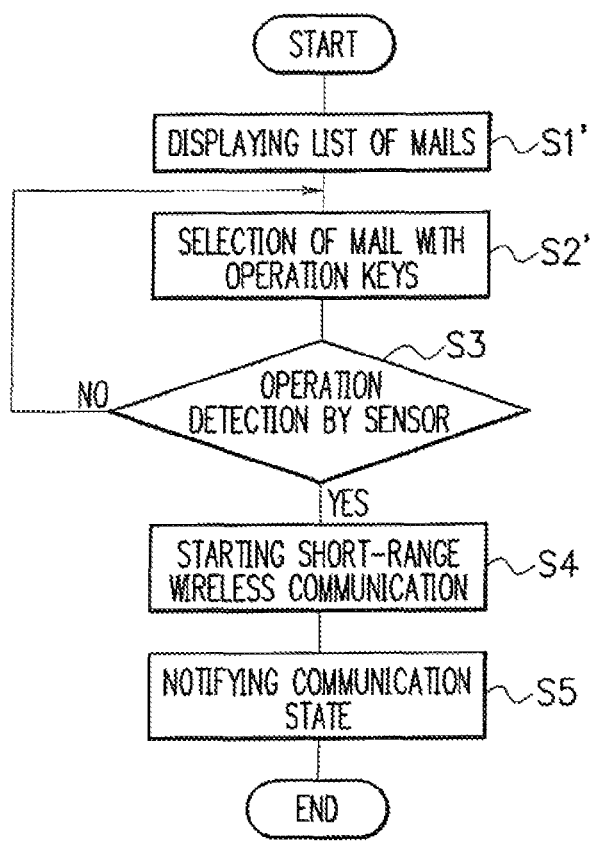
FIG. 7 is a view showing another operation flow of a cell phone terminal according to an exemplary embodiment of the present invention.

Another operation flow of a cell phone terminal according to the exemplary embodiment is shown in FIG. 7. Although this operation is approximately same as the above mentioned operation, since data to be transferred are electronic mail data, contents of the steps S1' and S2' are different from the above mentioned operation.

Figure 8:
FIG. 8 is a view showing an example of an interface for selecting an electronic mail to be transferred.

The CPU 11 displays a list of electronic mail data stored in the memory 15 in the display unit 20 as shown in FIG. 8(*a*) to prompt a user to select the electronic mail data (step S1'). The display control unit 19 changes or heightens a display color around the selected electronic mail in accordance with the user's operation using the operation keys 18 so that the user can recognize that cursor is matched (selected) to the selected electronic mail (step S2'). As shown in FIG. 8(*b*), the electronic mail data to be selected may not be displayed as a list, but the full text thereof may be displayed.

Figure 9:
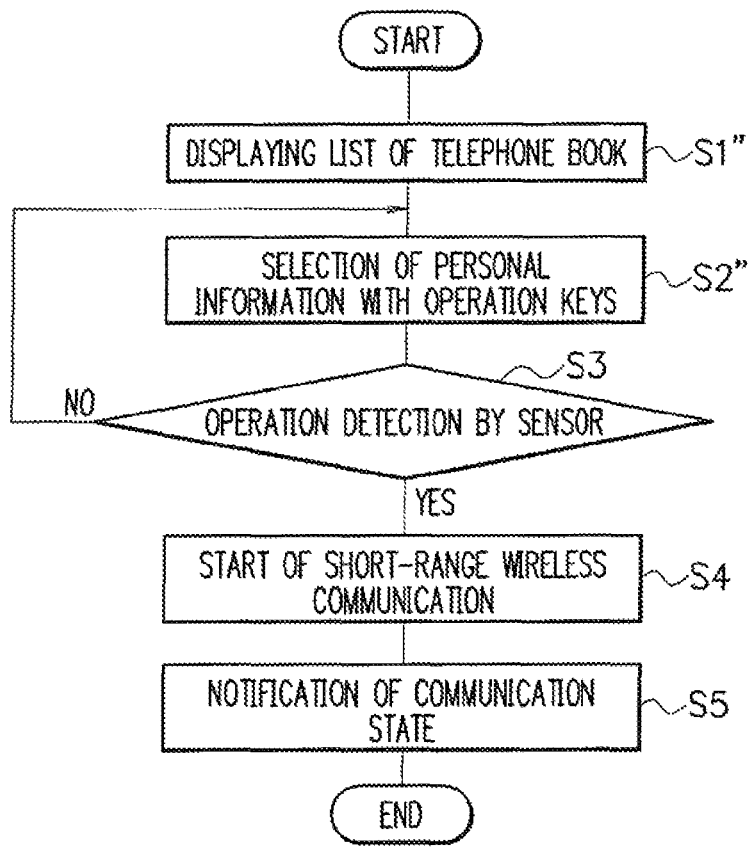
FIG. 9 is a view showing another operation flow of a cell phone terminal according to an exemplary embodiment of the present invention.

Further another operation flow of a cell phone terminal according to the exemplary embodiment is shown in FIG. 9. Although this operation is approximately same as the above mentioned operation, since data to be transferred are telephone book data, contents of the steps S1" and S2" are different from the above mentioned operations.

The CPU 11 displays a list of telephone book data stored in the memory 15 in the display unit 20 as shown in FIG. 10(*a*) to prompt a user to select the telephone book data (step S1"). The display control unit 19 changes or heightens a display color around the selected personal information in accordance with the user's operation using the operation keys 18 so that the user can recognize that cursor is matched (selected) to the selected personal information (step S2"). As shown in FIG. 10(*b*), the personal information to be selected may not be displayed as a list, but the detail thereof may be displayed.

As above mentioned, the cell phone terminal of the exemplary embodiment can start the data communication between the terminals without complicated operations.

Since the above exemplary embodiments are examples of the preferable exemplary embodiments of the present invention, the present invention is not limited to the above exemplary embodiments.

For instance, in the above embodiments, although the cell phone terminal is described as an example, a communication function thorough a cell phone network may not be provided; therefore, the present invention can be applied to an electronic notebook, a PDA, a portable video game player, and the like.

In addition, in the above exemplary embodiments, although the selected data are transferred to another terminal by the short-range wireless communication, a different operation may be performed. For example, when the cell phone terminal is tilted in a state that the data are selected, the selected data may be copied in a memory card. Namely, arbitrary processing performed on the selected data as a target to be processed can be started.

As above described, the present invention is capable of various changes.

The invention claimed is:

1. A portable terminal, comprising: a sensor detecting changes in posture or physical movement of the portable terminal; and a communication unit, wherein, when the sensor detects the change in posture or physical movement of the portable terminal, the communication unit transmits a selected data, and wherein, when the sensor detects that the portable terminal is tilted at an angle more than a predetermined angle, the communication unit transmits the selected data.

2. The portable terminal according to claim 1,
wherein, if an other terminal as a communication counterpart is searched, and an existence of the other terminal is recognized, the communication unit sends the selected data to the other terminal.

3. The portable terminal according to claim 1,
wherein the communication unit performs short-range wireless communication.

4. The portable terminal according to claim 1,
wherein, when the sensor detects acceleration larger than a predetermined value, the communication unit transmits the selected data.

5. A method for transferring data using a portable terminal, comprising the steps of: detecting changes in posture or physical movement of the portable terminal; and transmitting a selected data when having detected the change in posture or physical movement of the portable terminal wherein, when detecting that the portable terminal is tilted at an angle more than a predetermined angle, the selected data are transmitted.

6. The method for transferring data using the portable terminal according to claim 5, wherein,
if an other terminal as a communication counterpart is searched, and an existence of the other terminal is recognized, the selected data are sent to the other terminal.

7. The method for transferring data using the portable terminal according to claim 5, wherein,
in step of transmitting the selected data, short-range wireless communication is performed.

8. The method for transferring data using the portable terminal according to claim 5, wherein,
when detecting acceleration larger than a predetermined value, the selected data are transmitted.

* * * * *